United States Patent [19]

Huang et al.

[11] Patent Number: 5,712,214
[45] Date of Patent: Jan. 27, 1998

[54] REGENERATION OF AROMATIZATION CATALYSTS

[75] Inventors: Yao-Jyh Robert Huang, Taipei, Taiwan; Shun Chong Fung, Annandale, N.J.

[73] Assignee: Exxon Research & Engineering Company, Florham Park, N.J.

[21] Appl. No.: 163,455

[22] Filed: Dec. 7, 1993

Related U.S. Application Data

[63] Continuation-in-part of Ser. No. 942,694, Sep. 9, 1992, and Ser. No. 940,579, Sep. 4, 1992, each is a continuation of Ser. No.709,154, Jun. 3, 1991, abandoned, which is a continuation of Ser. No. 205,567, Jun. 15, 1988, Pat. No. 4,925,819, which is a continuation of Ser. No. 814,027, Dec. 23, 1985, abandoned, which is a continuation of Ser. No. 550,951, Nov. 10, 1983, abandoned.

[51] Int. Cl.$^6$ .............. B01J 29/90; B01J 38/42; B01J 38/44; C10G 35/095

[52] U.S. Cl. .............. 502/37; 208/140; 502/35; 502/36

[58] Field of Search .............. 502/37, 35, 36; 208/140, 134, 138

[56] References Cited

U.S. PATENT DOCUMENTS

| | | | |
|---|---|---|---|
| 2,952,611 | 9/1960 | Haxton et al. | 208/65 |
| 3,011,967 | 12/1961 | Schmitkons et al. | 208/139 |
| 3,020,240 | 2/1962 | Lockett | 252/419 |
| 3,134,732 | 5/1964 | Kearby et al. | 208/140 |
| 3,234,120 | 2/1966 | Capsuto | 208/138 |
| 3,637,524 | 1/1972 | Johnson et al. | 252/415 |
| 3,673,109 | 6/1972 | Georgescu et al. | 252/415 |
| 3,835,063 | 9/1974 | Davis et al. | 252/415 |
| 3,986,982 | 10/1976 | Growson et al. | 502/37 |
| 4,133,743 | 1/1979 | Boret et al. | 208/64 |
| 4,251,349 | 2/1981 | McCoy et al. | 208/64 |
| 4,374,654 | 2/1983 | McCoy | 55/71 |
| 4,447,551 | 5/1984 | Fung et al. | 502/37 |
| 4,467,045 | 8/1984 | Fung | 502/35 |
| 4,493,901 | 1/1985 | Bernard et al. | 502/37 |
| 4,552,856 | 11/1985 | Tauster et al. | 502/74 |
| 4,595,668 | 6/1986 | Poeppelmeier et al. | 502/66 |
| 4,595,669 | 6/1986 | Fung et al. | 502/74 |
| 4,595,670 | 6/1986 | Tauster et al. | 502/74 |
| 4,634,517 | 1/1987 | Tauster et al. | 208/138 |
| 4,645,751 | 2/1987 | McCullen et al. | 502/37 |
| 4,648,960 | 3/1987 | Poeppelmeier et al. | 208/138 |
| 4,810,683 | 3/1989 | Cohn et al. | 502/37 |
| 4,851,380 | 7/1989 | Van Leirsburg et al. | 502/37 |
| 4,855,269 | 8/1989 | Mohr | 502/37 |
| 4,914,068 | 4/1990 | Cross et al. | 502/74 |
| 4,925,819 | 5/1990 | Fung et al. | 502/37 |

FOREIGN PATENT DOCUMENTS

| | | |
|---|---|---|
| 0142352 | 5/1985 | European Pat. Off. |
| 8000114 | of 0000 | France. |
| 2325289 | 4/1977 | France. |
| 2360540 | 3/1978 | France. |
| 1063819 | 3/1967 | United Kingdom. |
| 2106413 | 4/1983 | United Kingdom. |

*Primary Examiner*—Ponnathapura Achutamurthy
*Attorney, Agent, or Firm*—Edward F. Sherer

[57] ABSTRACT

A low-pressure, high-temperature, wet post-treatment after oxyhalogenation during regeneration to improve activity and selectivity recovery of a regenerated catalyst involves exposing a halogenated catalyst to a gaseous stream including water having a partial pressure of up to about 1.5 psia, oxygen having a partial pressure of less than about 4.5 psia, and an inert gas at a temperature within the range of about 450° C. to about 530° C. at a pressure within the range of about 14.7 psia to about 65 psia for a time sufficient to effect a hydrogen halide partial pressure in offgas from the halogenated catalyst of less than about 0.004 psia to effectively remove excess halide from the halogenated catalyst.

39 Claims, No Drawings

REGENERATION OF AROMATIZATION CATALYSTS

CROSS-REFERENCE TO RELATED APPLICATIONS

This application is a Continuation-In-Part of U.S. Ser. No. 07/942,694, filed Sep. 9, 1992; and U.S. Ser. No. 07/940,579, filed Sep. 4, 1992; each of which is a Continuation of U.S. Ser. No. 07/709,154, filed Jun. 3, 1991, now abandoned; which is a Continuation of U.S. Ser. No. 07/205,567, filed Jun. 15, 1988, which issued as U.S. Pat. No. 4,925,819; which is a Continuation of U.S. Ser. No. 814,027, filed Dec. 23, 1985, now abandoned; which is a Continuation of U.S. Ser. No. 550,951, filed Nov. 10, 1983, now abandoned, all disclosures of which are incorporated in their entireties by reference thereto herein.

FIELD OF THE INVENTION

The present invention relates to regeneration of reforming catalysts. More specifically, the present invention is directed to an improved regeneration process for zeolite-based reforming catalysts which involves low pressure, high temperature, wet post-treatment after the oxychlorination stage of the regeneration process.

DISCUSSION OF BACKGROUND INFORMATION

Zeolite-based reforming catalysts, such as Pt/KL, exhibit superior advantages in reforming light naphtha compare to conventional alumina-based reforming catalysts.

During reforming, catalysts deactivate due to accumulation of coke deposits in the catalyst, and agglomeration of fine catalytic metal particles disperse in the catalyst into larger particles. Therefore, it is common practice to periodically regenerate reforming catalysts to recover their activity. However, it has been found that it is more difficult to regenerate the zeolite-based reforming catalysts than the conventional alumina-based catalysts.

Previously, regeneration procedures have been developed to rejuvenate the zeolite-based reforming catalysts, namely Pt/KL catalysts.

An example of a regeneration procedure involves subjecting a catalyst to a two-stage coke burn wherein the first stage of coke burn is conducted at a temperature of about at 445° C. and a pressure of about 185 psia for 2 hours with 1 vol % oxygen and a 9 to 1 recycle ratio, followed by a coke burn at a temperature of about 510° C. and a pressure of about 185 psia for 14 hours with 3 vol % oxygen and a 9 to 1 recycle ratio. The coke burned catalyst is then subjected to oxychlorination at a temperature of about 510° C. and a pressure of about 185 psia for 3 hours with 600 vppm HCl, vol % water vapor, and 0.84 vol % oxygen and a 9 to 1 recycle ratio. The oxychlorinated catalyst is then cooled down to 345° C. over four hours under oxychlorination conditions. Subsequently, the cooled oxychlorinated catalyst is then stripped at 345° C. with 10 vol % oxygen and 3 vol % water vapor in nitrogen at atmospheric pressure for 13 hours, followed by stripping at 345° C. with 10 vol % oxygen in nitrogen for one hour at atmospheric pressure. The catalyst is then purged with nitrogen at 345° C. for one hour at atmospheric pressure, prior to reducing the catalyst with 10 vol % hydrogen at 345° C. and atmospheric pressure for 2.5 hours.

Although catalysts regenerated by the procedures described above have a higher activity and a better stability than the fresh catalysts, benzene selectivity of the regenerated catalyst is 5 to 10 points lower than that of the fresh catalyst.

SUMMARY OF THE INVENTION

The present invention is based on the discovery that this selectivity loss of the regenerated catalyst can be eliminated by using a low pressure, high temperature, wet post-treatment procedure in the procedure for regenerating aromatization catalysts in accordance with the present invention.

In this regard, the regeneration of aromatization catalysts of the present invention involves exposing a halogenated catalyst to a gaseous stream including water having a partial pressure of up to about 1.5 psia, oxygen having a partial pressure of less than about 4.5 psia, and an inert gas at a temperature within the range of about 450° C. to about 530° C. at a pressure within the range of about 14.7 psia to about 65 psia for a time sufficient to effect a hydrogen halide partial pressure in offgas from the halogenated catalyst of less than about 0.004 psia to effectively remove excess halide from the halogenated catalyst.

For purposes of the present invention, it is important to remove residual halide on the catalyst after oxyhalogenation since the residual halide released during the subsequent reduction can induce platinum re-agglomeration.

The high temperature, wet post-treatment is believed to further improve the efficiency of residual halide removal.

DETAILED DESCRIPTION

The regeneration process of the present invention is described in more detail hereinbelow.

Coke Burn

Coke which accumulates on the catalyst during hydrocarbon processing must be removed to regenerate the catalyst because catalytic performance of the regenerated catalyst is impaired if coke residues remain on the catalyst. Coke is removed by burning it off with oxygen. In addition to using oxygen, ozone can also be used for this purpose. Although not wishing to be bound by any particular theory, it is believed that the use of ozone speeds up the coke burn. The partial pressure of oxygen in this gas stream during coke burn can be up to 10 psia. However, care must be exercised to avoid exposing the catalyst to excessively high temperatures. In another embodiment, halogen halide, such as HCl, can be included in this gas flow. In accordance with the present invention, the coke burn is conducted in two stages: a primary coke burn at less severe conditions followed by a secondary coke burn at more severe conditions. The two-stage coke burn has been discovered to be advantageous in mitigating risk of exceeding zeolite decomposition temperature at the flame front. The coke burn is conducted at a pressure as low as about 14.7 psia but up to about 300 psia and preferably up to about 200 psia, with a pressure within the range of about 50 psia to about 200 psia being more preferred, and a pressure of about 185 psia being most preferred. Gas flow rate to the reactor is set to maintain at least about 0.5 FPS linear gas velocity through the catalyst.

The primary coke burn is initiated by injecting oxygen, ozone, or air into the inert gas flowing to the reactors. The inlet gas temperature is between about 400° C. to about 500° C., and preferably between about 400° C. and about 480° C., and more preferably about 445° C., and the oxygen concentration in the reactor inlet gas is adjusted to between about 500 vppm and about 6000 vppm, and preferably between about 1000 vppm and about 4000 ppm. A low concentration of oxygen is used in the primary coke burn to avoid excessively high temperature, because of adiabatic coke burn conditions. Under adiabatic coke burn, the increase in the flame front temperature depends solely on oxygen concentration regardless of total pressure. Higher oxygen concentration can be used in the primary coke burn when the coke burn is not carried out under adiabatic conditions. During the primary coke burn the gas flow may be essentially devoid of water, i.e., having a water partial pressure of about 0 psia, or include an amount of water reflected by a water partial pressure of less than about 0.3 psia, and more preferably within the range of about 0 to 0.1 psia. Most preferably, the gas flow during coke burn is essentially devoid of water or contains no water. At these conditions the temperature of the catalyst is maintained safely below catalyst decomposition temperature at a most preferred pressure of about 185 psia. $CO_2$ and oxygen concentration in the reactor outlet gas stream are continuously measured to determine when the primary coke burn is completed, i.e., when the molar ratio of $CO_2$ to $O_2$ falls below about 3:1, which occurs typically about two to fifty hours into the burn.

At this point transition into the secondary coke burn is begun. Gas inlet temperature is then raised at a rate of about 25° C. to about 50° C. per hour to the secondary coke burn temperature which is between about 500° C. and about 530° C., and preferably within the range of about 500° C. to about 520° C., and more preferably at about 510° C., at a most preferred pressure of a 185 psia. Simultaneously, oxygen partial pressure is raised to a secondary coke burn level, i.e., up to about 10 psia, preferably within the range of about 0.1 psia to about 8 psia, and more preferably within the range of about 2 psia to about 7 psia. In the secondary coke burn, water may be present at a partial pressure less than about 0.3 psia, and preferably less than about 0.1 psia. However, most preferably the gas flow is essentially devoid of water and has a water partial pressure of about 0 psia.

The secondary coke burn is continued until the $CO_2$ partial pressure in the outlet gas from the reactor falls below about 0.01 psia, and preferably below 0.004 psia. This typically occurs about 12 hours into the secondary burn, depending on the amount of catalyst in the reactor. It has been discovered that the activity of regenerated catalyst is impaired if the coke burn is terminated prematurely, i.e., before $CO_2$ partial pressure falls below about 0.004 psia to about 0.01 psia.

Although coke burn is performed at temperature within the range of about 400° C. to about 550° C., under conditions otherwise described above, to result in a substantially decoked catalyst, it should be pointed out that it is preferred to perform the coke burn so that resultant agglomerated Group VIII catalytic metal particles have an average particle size of less than 200 Å, and preferably have an average particle size of less than about 150 Å, and more preferably in the range of about 20 Å to about 50 Å. Preferably, this can be accomplished by controlling the temperatures during coke burn so as not to exceed about 530° C. and the amount of water to be present at a partial pressure of water of less than about 0.1 psia, respectively, during this step. For example, it is preferred that the gaseous stream during coke burn be essentially devoid of water, in which case resultant agglomerated Group VIII catalytic metal particles typically have an average particle size of less than about 50 Å.

During coke burn, the gas stream is recycled or recirculated from the tail reactor to the lead reactor, where a series of two or more reactors is used, in order to conserve the inert carrier gas, i.e., nitrogen, by employing an in-line recycle gas compressor. Preferably, about 10% of the recycle gas flow is purged with the fresh coke burn gas prior to recirculating the stream.

Oxyhalogenation

Oxyhalogenation is done at a pressure within the range of about 14.7 psia to about 300 psia, preferably within the range of about 14.7 psia to about 200 psia, more preferably within the range of about 50 psia to about 200 psia, and most preferably at about 185 psia. Oxyhalogenation temperatures are between about 480° C. and 550° C., preferably between 500° C. and 530° C., and most preferably at about 510° C. Inert gas flow rate is adjusted to make the linear gas velocity in the reactors above about 0.5 FPS at operating pressure and temperature. Halogen is provided by a source of halogen which is preferably a source of chlorine. HCl is a preferred source of chlorine because HCl converts to chlorine by reaction with oxygen via the Deacon reaction so chlorine is in fact the active chlorinating agent. Water partial pressure in the reactor inlet gas is between about 0 psia and about 3.0 psia, preferably between about 0 psia and about 2 psia, and most preferably 0.2 psia to about 2 psia. Oxygen partial pressure is between about 0 psia and about 10 psia, preferably between about 1 psia and about 5 psia, and more preferably between about 1 psia and about 2 psia. The partial pressure of the source of halogen, which is preferably a source of chlorine, such as HCl, in the reactor inlet gas ranges up to about 0.5 psia, preferably within the range of about 0.01 psia to about 0.5 psia, more preferably of about 0.02 to about 0.3 psia, and most preferably within the range of about 0.02 to 0.2 psia.

In accordance with the present invention, completion of oxychlorination is signaled by appearance of chlorine and HCl referred to herein as chlorine breakthrough, in the reactor effluent gas at a partial pressure greater than 0.01 psia. Time to chlorine breakthrough after initiation of HCl flow is proportional to the chlorine feed rate and is inversely proportional to the amount of catalyst in the reactors; it typically takes between about 2 to about 6 hours.

After chlorine breakthrough, oxychlorination is continued for an additional time period of up to about 6 hours, preferably within the range of about 2 hours to about 5 hours.

In a manner similar to coke burn, the gas stream is recycled, i.e., recirculated, from the tail reactor to the lead reactor, where a series of two or more reactors is used, in order to conserve nitrogen of the inert carrier gas by employing an in-line recycle gas compressor. Preferably, about 10% of the recycle gas flow is purged with the purged amount being replaced with fresh oxychlorination gas prior to recirculating the stream.

Post-Oxyhalogenation Stripping

The purpose of stripping is to remove excess halogen, i.e., chlorine, from the catalyst. Chlorine evolves during the subsequent hydrogen reduction step as HCl and induces agglomeration of the catalytic metal particles in proportion to HCl partial pressure. Accordingly, the more chlorine stripped from the catalyst prior to reduction, the higher will be the activity of the regenerated catalyst.

To improve the removal of chlorine, stripping is done at about atmospheric pressure or 14.7 psia up to about 65 psia, preferably at about 14.7 psia, with stripping gas containing oxygen at a partial pressure of oxygen of less than about 4.5 psia, preferably less than about 3.0 psia, and more preferably within the range of about 0.7 psia to about 3.0 psia, in an inert carrier gas stream. In accordance with the present invention, the amount of water in the stripping gas should be present at a partial pressure of water of up to about 1.5 psia, preferably up to about 0.75 psia, more preferably is up to about 0.4 psia, and most preferably within the range of about 0.05 psia to about 0.4 psia. Preferably the requisite amount of water in the stripping gas is supplied by injecting water into the reactor inlet gas stream and adjusting the injected amount according to the reactor total pressure to yield the requisite partial pressure of water. Stripping is continued until the HCl partial pressure in the reactor offgas falls below about 0.004 psia and preferably below about 0.003 psia, but most preferably below about 0.0015 psia. This typically can take between about one and thirty hours.

Also, to promote and enhance the efficiency of chlorine evolution, it is important that the stripping step be done at as low a pressure as practicable. In most cases this is about atmospheric pressure, i.e., 14.7 psia; however, stripping can be enhanced by pulling vacuum on the reactors.

It is also important to maintain a temperature of at least about 450° C., preferably within the range of about 450° C. to about 530° C., more preferably of about 480° C. to about 520° C., and most preferably at about 510° C., during stripping. However, stripping may be carried out at higher reactor pressure with reduced stripping efficiency and, therefore, requires a longer time of stripping.

In accordance with the stripping step of the regeneration procedure of the present invention, the effluent gas from the stripping step, i.e., the gas stream from the outlet of the vessel containing the catalyst, is preferably not be recycled. Accordingly, the stripping step is preferably performed as a "once-through" operation. As used herein, a "once-through" operation involves passing the treatment gas once-through the catalyst being regenerated. The treatment gas, after passing through the catalyst being regenerated, as effluent treatment gas is then exhausted or purged from the outlet of the catalyst bed or reactor vessel. In the reactor train, the effluent treatment gas is exhausted or purged from the downstream tail reactor.

Purge

The regeneration procedure includes purge steps. Although the step of purging the reactor is described in detail at this stage of the process, it should be noted that the reactor may be purged in a similar manner between any of the steps as desired or deemed to be necessary. For example, it is of practical importance to purge between steps to remove any gases from the reactor which might undergo a detrimental or adverse reaction if permitted to remain in the reactor during a subsequent step, such as oxygen and hydrogen.

Purging can be done over a wide range of conditions. Suitable pressures can range from about 14.7 psia up to about 300 psia and suitable temperatures are those within the range of about 480° C. to about 520° C. The preferred pressure is about 14.7 psia. The inert gas flow rate should be sufficient to establish at least about 0.5 FPS linear gas velocity through the catalyst bed at operating pressure and temperature. This insures uniform gas flow distribution across the catalyst bed and effective gas/solid contacting for good purging action. Purging at these conditions for one to five hours adequately purges the reactor.

Hydrogen Reduction

The final step is reduction of catalytic metals, e.g., platinum, now dispersed uniformly across the surfaces of the catalyst as chlorides, to small zero valent metal clusters.

This is accomplished by exposing the stripped catalyst to hydrogen at a temperature greater than about 450° C., preferably within the range of between about 450° C. and about 530° C., more preferably within the range of about 480° C. and about 520° C., and most preferably at about 510° C. Oxygen left in the stripping step is purged with inert gas, such as nitrogen, down below the explosion limit prior to introducing hydrogen. In the process of this invention, the reduction is accomplished with a gas stream containing hydrogen having a partial pressure of hydrogen greater than 0.015 psia, preferably within the range of about 0.015 psia to about 14.7 psia, more preferably of about 0.15 psia to about 5.0 psia, and most preferably of about 0.4 psia to about 1.0 psia. The gas stream at the reactor inlet for the hydrogen reduction step also contains water at a partial pressure of water of up to about 1.5 psia, preferably up to about 0.75 psia, more preferably less than about 0.4 psia, and most preferably within the range of about 0.05 psia to about 0.4 psia, in inert gas, and the reduction is conducted for a period of about one to about two hours.

Although the exact reduction conditions used may vary, hydrogen feed rate is controlled such that the partial pressure HCl in reactor offgas does not exceed about 0.0075 psia. Preferably, the reduction step is performed at a reactor total pressure of about 14.7 psia to about 65 psia, and preferably at about 14.7 psia. However, reactor pressure higher than 65 psia may be used in this reduction step. For an easy operation, it is preferable to operate this reduction step at the same pressure as the previous stripping step. For purposes of the hydrogen reduction step in accordance with the present invention, the effluent gas is preferably not recycled. Accordingly, the hydrogen reduction step is conducted as a once-through operation. In such embodiment, however, the catalyst has to be dried out after wet reduction in step (d) and before introducing hydrocarbon feed into the reactor with a drying gas comprising at least one member selected from the group consisting of nitrogen and hydrogen to a water partial pressure of less than about 0.004 psia, preferably less than about 0.003 psia, and more preferably less than about 0.0015 psia. This drying step, therefore, is accomplished by reducing the partial pressure of water in the gas stream introduced at the inlet of the vessel containing the catalyst to result in the partial pressure of water in the gas at the outlet of less than 0.004 psia. Thus, the gas at the outlet is substantially devoid of water.

For purposes of the present invention, the catalyst is preferably a formed catalyst, which more preferably has a shape selected from the group consisting tablets, pellets, spheres, and extrudates. For purposes of the present invention, the catalyst includes a binder material, which is preferably selected from the group consisting of kaolin, alumina, and silica and mixtures thereof to promote binding into aggregates. As used herein alumina binder materials include, but are not limited to, alkali and alkaline earth—containing alumina. The catalyst most preferably is monofunctional and non-acidic, and the zeolite is a large pore zeolite, which preferably is a type L zeolite. The type L zeolite preferably comprises exchangeable cations at least a portion of which are selected from the group of exchangeable cations consisting of lithium, sodium, potassium, rubidium, cesium, magnesium, calcium, and barium, and mixtures of lithium, sodium, potassium, rubidium, cesium, magnesium, calcium, strontium, and barium, more preferably, wherein the group of exchangeable cations consists of potassium, magnesium, and barium, and most preferably are potassium cations.

The Group VIII catalytic metals are preferably Group VIII noble metals which are preferably selected from the group consisting of platinum, palladium, rhodium, iridium, ruthenium and osmium, and most preferably platinum. The amount of the Group VIII catalytic metal present is preferably within the range of about 0.05% to about 6%.

The catalytic metal may further comprise a Group VII B metal, such as rhenium, which is a preferred Group VII B metal.

As used herein, the metals have been identified and are grouped in accordance with the Period Table in the *Handbook of Chemistry & Physics*, published by the Chemical Rubber Company, 48th edition.

For purposes of the present invention, as described above, the process conditions comprise a linear gas velocity through the catalyst of at least about 0.5 FPS.

The concentrations of the gases used, expressed as partial pressure, depend upon the operating pressure and are adjusted accordingly to yield a desired range of partial pressure of the gas component wherein the partial pressure of gas A=the concentration of A×the total pressure.

EXAMPLE 1

The activity of the fresh and regenerated catalysts were compared by running both at the reforming conditions of 505° C., 1.3 WHSV; 105 psig; 2 $H_2$/oil; on a $C_6$ raffinate feed.

For purposes of this example, a typical regeneration procedure as follows was used for regenerating the catalyst.

Initially, the catalyst is subjected to a two-stage coke burn wherein the first stage of coke burn is conducted at a temperature of about 445° C. under a pressure of about 185 psia for 2 hours with 1 vol % oxygen and a 9 to 1 recycle ratio, followed by a coke burn at a temperature of about 510° C. under a pressure of about 185 psia for 14 hours with 3 vol % oxygen and a 9 to 1 recycle ratio. The coke burned catalyst is then subjected to oxychlorination at a temperature of about 510° C. under a pressure of about 185 psia for 3 hours with 600 vppm HCl, 0.66 vol % water vapor, and 0.84 vol % oxygen and a 9 to 1 recycle ratio. The oxychlorinated catalyst is then cooled down to 345° C. over four hours under oxychlorination conditions. Subsequently, the cooled oxychlorinated catalyst is then stripped at 345° C. with 10 vol % oxygen and 3 vol % water vapor in nitrogen at atmospheric pressure for 13 hours, followed by stripping at 345° C. with 10 vol % oxygen in nitrogen for one hour at atmospheric pressure. The catalyst is then purged with nitrogen at 345° C. for one hour at atmospheric pressure, prior to reducing the catalyst with 10 vol % hydrogen at 345° C. and atmospheric pressure for 2.5 hours.

The benzene (Bz) yield and selectivity at 150 hours are:

|  | Fresh | Regenerated |
|---|---|---|
| Bz Yield, wt % | 32 | 42 |
| Bz Selectivity, % | 74 | 64 |

The regenerated catalyst gives a higher benzene yield than the fresh catalyst. However, the benzene selectivity of the regenerated catalyst is 10 points lower than that of the fresh catalyst. Further improvement in benzene yield of the regenerated catalyst can be realized if the selectivity loss can be eliminated.

EXAMPLE 2

The aromatization activities of the fresh and the regenerated catalysts at 140 hours under test conditions of 50 psig, 2 WHSV, 543° C., and 4 $H_2$/oil with $C_6/C_7$ raffinate feed.

The regeneration procedure used in Example I was used for purposes of Example II except that stripping was performed at 510° C. with 10 vol % oxygen and 2.2 vol % water vapor in nitrogen at atmospheric pressure for 10 hours; purging was accomplished using 2.2% water in nitrogen at 510° C. for one hour at atmospheric pressure; and reducing was performed with 5.8 vol % in hydrogen and 2.2 vol % water at 510° C. and atmospheric pressure for 2.5 hours. The catalyst is then cooled down under dry hydrogen stream to 454° C. and held at 454° C. for 6 hours to thoroughly dry out the catalyst. The water partial pressure at the reactor effluent is less than 0.004 psia.

The results are tabulated below:

|  | Fresh | Regenerated |
|---|---|---|
| BTX yield, wt % | 31 | 63 |
| BTX selectivity, % | 82 | 82 |

The regenerated catalyst has a BTX yield twice that of the fresh catalyst. The deactivation rate of the fresh catalyst is about 6 times of that of the regenerated catalysts. The 5 to 10 points of selectivity debit existed in the previous Pt/KL catalysts, regenerated with a low-temperature, post-treatment no longer appear on the regenerated catalyst with the improved regeneration procedure.

This example evidences the unexpected discovery of the present invention that selectivity loss can be eliminated by using low pressure, high temperature, wet post-treatment in the regeneration procedure.

Although not wishing to be bound by any particular theory, it is believed that the high temperature wet post-treatment at 510° C. is believed to further improve the efficiency of residual Cl removal.

EXAMPLE 3

The aromatization activities of the fresh Pt/KL catalysts and regenerated Pt/KL catalysts, regenerated according to the present invention, were compared at 120 hours under test conditions of 488° C., 160 psig, 2 $H_2$/oil, and 1.3 WHSV with a $C_6$ raffinate feed.

The regeneration procedure in accordance with the present invention used to regenerate the Pt/KL catalyst for this example involved subjecting the catalyst to a two-stage coke burn wherein the first stage of coke burn is conducted at a temperature of about 445° C. under a pressure of about 185 psia for 2 hours with 1 vol % oxygen and a 9 to 1 recycle ratio, followed by a coke burn at a temperature of about 510° C. under a pressure of about 185 psia for 14 hours with 3 vol % oxygen and a 9 to 1 recycle ratio. The coke burned catalyst is then subjected to oxychlorination at a temperature of about 510° C. under a pressure of about 185 psia for 3 hours with 600 vppm HCl, 0.66 vol % water vapor, and 0.84 vol % oxygen and a 9 to 1 recycle ratio. Subsequently, the oxychlorinated catalyst is then stripped at 510° C. with 10 vol % oxygen and 2.2 vol % water vapor in nitrogen at atmospheric pressure for 10 hours. The catalyst is then purged with 2.2 vol. % water nitrogen at 510° C. for one hour at atmospheric pressure, prior to reducing the catalyst with 5.8 vol % hydrogen and 2.2 vol % water at 510° C. and atmospheric pressure for 2.5 hours.

The catalyst is then cooled down under dry hydrogen steam to 454° C. and held at 454° C. for 6 hours to thoroughly dry out the catalyst. The water pressure of the effluent is less than 0.004 psia.

The results are tabulated as follows:

|  | Fresh | Regenerated |
| --- | --- | --- |
| Bz Yield, wt % | 40 | 44 |
| Bz Selectivity, % | 69 | 68 |

The selectivity of the regenerated catalyst is restored to the value of the fresh catalyst.

What is claimed is:

1. A process for regenerating a monofunctional, non-acidic deactivated reforming catalyst in a vessel having an inlet and an outlet, said catalyst comprising at least one Group VIII catalytic metal, zeolite L, and a binder, said process comprising the following steps:

(a) subjecting said deactivated catalyst to a first gaseous stream comprising inert gas and oxygen present at a partial pressure within the range up to about 10 psia under oxidation conditions comprising a temperature within the range of about 400° C. to about 530° C. and a pressure within the range of about 14.7 psia to about 300 psia, and for a time effective to burn coke off said deactivated catalyst to result in a gas flow at said outlet comprising a partial pressure of $CO_2$ of less than about 0.01 psia and a substantially decoked catalyst comprising Group VIII catalytic metal particles having an average particle size of less than about 150 Å;

(b) treating said substantially decoked catalyst with a second gaseous stream comprising inert gas, oxygen at a partial pressure of up to about 10 psia, water at a partial pressure of up to about 3 psia, and a source of halogen at a partial pressure d up to about 0.5 psia under oxyhalogenation conditions comprising temperature within the range of about 480° C. to about 550° C. and a pressure within the range of about 14.7 psia to about 300 psia for a time effective to halogenate and disperse said at least one Group VIII catalytic metal to result in a halogenated catalyst comprising dispersed at least one Group VIII catalytic metal and a gas flow at said outlet comprising a partial pressure of halogen of greater than about 0.01 psia;

(c) exposing said halogenated catalyst to a third gaseous stream comprising water having a partial pressure of up to about 1.5 psia, oxygen having a partial pressure of less than about 4.5 psia, and an inert gas at a temperature within the range of about 450° C. to about 530° C. at a pressure within the range of about 14.7 psia to about 65 psia for a time sufficient to effect a hydrogen halide partial pressure in offgas from said halogenated catalyst of less than about 0.004 psia to effectively remove excess halide from said halogenated catalyst; and (d) reducing said halogenated catalyst from which excess halide has been removed by subjecting said halogenated catalyst to a fourth gaseous stream comprising inert gas, hydrogen having a partial pressure greater than about 0.015 psia and water having a partial pressure of up to about 1.5 psia at a temperature within the range of about 450° C. to about 530° C. at a pressure within the range of about 14.7 psia to 65 psia to reduce said at least one Group VIII catalytic metal in said catalyst to the metallic state and result in a regenerated catalyst.

2. The process for regenerating a deactivated catalyst of claim 1, further comprising exposing said halogenated catalyst after step c) to a displacement gas flow for a time sufficient to purge oxygen from said halogenated catalyst prior to reducing said halogenated catalyst in d).

3. The process for regenerating a deactivated catalyst of claim 2, wherein said exposing said halogenated catalyst after step c) to a displacement gas flow is performed as a once-through operation.

4. The process for regenerating a deactivated catalyst of claim 1, wherein said pressure in a) is within the range of about 50 psia to about 200 psia.

5. The process for regenerating a deactivated catalyst of claim 1, wherein the Group VIII catalytic metal particles in a) have an average particle size within the range of about 20 Å to about 50 Å.

6. The process for regenerating a deactivated catalyst of claim 1, wherein said first gaseous stream has a water partial pressure of less than about 0.1 psia.

7. The process for regenerating a deactivated catalyst of claim 6, wherein said gaseous stream in a) is substantially devoid of water.

8. The process for regenerating a deactivated catalyst of claim 1, wherein said partial pressure of $CO_2$ in said outlet gas flow in a) is less than about 0.004 psia.

9. The process for regenerating a deactivated catalyst of claim 1, wherein said temperature in a) is within the range of about 500° C. to about 530° C.

10. The process for regenerating a deactivated catalyst of claim 1, wherein said partial pressure of oxygen in said first gaseous stream in a) is within the range of about 0.1 psia to about 8 psia.

11. The process for regenerating a deactivated catalyst of claim 1, wherein said partial pressure of oxygen in said second gaseous stream in b) is within the range of about 1 psia to about 2 psia.

12. The process for regenerating a deactivated catalyst of claim 1, wherein said partial pressure of water in said second gaseous stream in b) is within the range of about 0.2 psia to about 2 psia.

13. The process for regenerating a deactivated catalyst of claim 1, wherein said partial pressure of halogen in said second gaseous stream in b) is within the range of about 0.02 psia to about 0.3 psia.

14. The process for regenerating a deactivated catalyst of claim 13, wherein said source of halogen in said second gaseous stream in b) comprises a source of chlorine selected from the group consisting of $Cl_2$, HCl, chlorinated hydrocarbons, and mixtures of $Cl_2$, HCl and chlorinated hydrocarbons.

15. The process for regenerating a deactivated catalyst of claim 14, wherein said source of chlorine is selected from the group consisting of $Cl_2$ and HCl.

16. The process for regenerating a deactivated catalyst of claim 1, wherein said temperature in b) is within the range of about 500° C. to about 530° C.

17. The process for regenerating a deactivated catalyst of claim 1, wherein said process comprises maintaining halogen partial pressure of greater than about 0.01 psia in said gaseous stream at said outlet in b), and continuing the treating in b) with said gaseous stream having a partial pressure of halogen of greater than about 0.01 psia for a time period of up to about 6 hours.

18. The process for regenerating a deactivated catalyst of claim 1, wherein said pressure in b) is within the range of about 50 psia to about 200 psia.

19. The process for regenerating a deactivated catalyst of claim 1, wherein at least a portion of said gas flow exiting said outlet in a) is recycled to said inlet, and at least a portion of said gas flow exiting said outlet in b) is recycled to said inlet.

20. The process for regenerating a deactivated catalyst of claim 1, wherein said partial pressure of water in said third gaseous stream in c) is less than about 0.4 psia at said inlet.

21. The process for regenerating a deactivated catalyst of claim 1, wherein said partial pressure of oxygen in said third gas flow in c) is within the range of about 0.7 psia to about 3 psia.

22. The process for regenerating a deactivated catalyst of claim 1, wherein step c) is continued at least until partial pressure of halogen halide in said offgas at said outlet is less than about 0.0015 psia.

23. The process for regenerating a deactivated catalyst of claim 1, wherein said temperature in c) is within the range of about 480° C. to about 520° C.

24. The process for regenerating a deactivated catalyst of claim 1, wherein said pressure in c) is about 14.7 psia.

25. The process for regenerating a deactivated catalyst of claim 1, wherein step c) is performed as a once-through operation.

26. The process for regenerating a deactivated catalyst of claim 1, wherein said partial pressure of hydrogen in said fourth gaseous stream in d) is within the range of about 0.015 psia to about 5 psia.

27. The process for regenerating a deactivated catalyst of claim 1, wherein said partial pressure of water in said fourth gaseous stream in d) is less than about 0.4 psia.

28. The process for regenerating a deactivated catalyst of claim 1, wherein said pressure in d) is about 14.7 psia.

29. The process for regenerating a deactivated catalyst of claim 1, wherein said temperature in d) is within the range of about 480° C. to about 520° C.

30. The process for regenerating a deactivated catalyst of claim 1, wherein step d) is performed as a once-through operation.

31. The process for regenerating a deactivated catalyst of claim 1, wherein said zeolite comprises L zeolite, said L zeolite comprising exchangeable cations selected from the group consisting of exchangeable cations consisting of lithium, sodium, potassium, rubidium, cesium, magnesium, calcium, strontium, and barium, and mixtures of lithium, sodium, potassium, rubidium, cesium, magnesium, calcium, strontium, and barium.

32. The process for regenerating a deactivated catalyst of claim 31, wherein said exchangeable cations comprises a member selected from the group consisting of potassium, barium, and magnesium, and mixtures of potassium, barium, and magnesium.

33. The process for regenerating a deactivated catalyst of claim 1, wherein said Group VIII catalytic metal is present within the range of about 0.05 wt % to about 6 wt %.

34. The process for regenerating a deactivated catalyst of claim 1, wherein said at least one Group VIII catalytic metal comprises platinum.

35. The process for regenerating a deactivated catalyst of claim 1, wherein said catalyst further comprises rhenium.

36. The process for regenerating a deactivated catalyst of claim 1, wherein said binder is selected from the group consisting of kaolin, alumina, and silica, and mixtures of kaolin, alumina, and silica.

37. The process for regenerating a deactivated catalyst of claim 1, wherein linear velocity of gaseous streams in a), b), c), and d) through said catalyst is about 0.5 FPS.

38. The process for regenerating a deactivated catalyst of claim 1, wherein said inert gas comprises nitrogen.

39. The process for regenerating a deactivated catalyst of claim 1, further comprising drying said regenerated catalyst after step d) by subjecting said regenerated catalyst to a drying gas comprising at least one member selected from the group consisting of nitrogen and hydrogen to result in a water partial pressure of less than about 0.004 psia in effluent from said vessel.

* * * * *